United States Patent [19]

Cook

[11] 4,183,634

[45] Jan. 15, 1980

[54] REAR PROJECTION VIEWER HAVING SMALL AUXILIARY SCREEN

[75] Inventor: Gerald H. Cook, Lynnfield, Mass.

[73] Assignee: Polaroid Corporation, Cambridge, Mass.

[21] Appl. No.: 865,787

[22] Filed: Dec. 30, 1977

[51] Int. Cl.² ............................................ G03B 21/10
[52] U.S. Cl. .................................. 352/104; 352/129; 352/242; 353/74
[58] Field of Search ............... 352/129, 104, 133, 136, 352/242; 350/123; 353/18, 67, 74

[56] References Cited

U.S. PATENT DOCUMENTS

| | | | |
|---|---|---|---|
| 3,138,057 | 6/1964 | Castedello | 352/129 |
| 3,387,535 | 6/1968 | Bennett | 352/129 |
| 3,391,979 | 7/1968 | Lessler | 352/104 |
| 3,791,725 | 2/1974 | Young | 352/129 |
| 3,834,798 | 9/1974 | Cook | 352/104 |
| 3,904,283 | 9/1975 | Arai | 352/104 |

FOREIGN PATENT DOCUMENTS 2356670  5/1975  Fed. Rep. of Germany .......... 352/104

*Primary Examiner*—Monroe H. Hayes
*Attorney, Agent, or Firm*—Frederick A. Goettel, Jr.

[57] ABSTRACT

A rear projection viewer apparatus of the type wherein the projected images are initially projected downward towards a mirror mounted in the base of the viewer which redirects the projected images upwardly and forwardly to a viewing screen forming the front of the viewer. Means are provided for removing the mirror element from the downward path of the projected images and an auxiliary viewing screen smaller than the primary screen is disposed in the base of the viewer to receive the projected images thereupon thereby permitting viewing of the images on the smaller screen when the viewer is positioned with its primary viewing screen facing downward.

25 Claims, 4 Drawing Figures

REAR PROJECTION VIEWER HAVING SMALL AUXILIARY SCREEN

BACKGROUND OF THE INVENTION

1. Field of the Invention

This invention relates to photographic apparatus and, more particularly, to improved motion picture rear projection viewer apparatus.

2. Description of the Prior Art

Rear projection viewer apparatus in which the projection system and the viewing screen are combined in a single structural unit are well known in the prior art. Among other advantages, this type of viewer apparatus provides a compact portable unit which permits satisfactory pictorial displays in normal ambient light conditions, and is particularly suited to those instances where available space is limited.

A highly compact, rear projection viewer designed for operation of a motion picture film cassette is described in U.S. Pat. No. 3,701,127 entitled "Projector Apparatus" and assigned to the same assignee as the present invention. The viewer unit described in the above-cited patent provides a highly compact unit employing a lenticulated viewing screen which for reasons of compactness is inclined rearwardly over the base of the apparatus. Inasmuch as the viewing screen is inclined, a screen arrangement is provided which directs transmitted images over a given viewing zone, displaced from the axis perpendicular to the screen. Such a viewing screen is described in U.S. Pat. No. 3,848,980, entitled "Projector Apparatus and System Employing Unique Screen" also assigned to the same assignee as the present invention.

Under some conditions of extremely high ambient light conditions, for example, viewing outdoors on an extremely sunny, bright day, the image on the screen of such a viewer may not be sufficiently bright for good viewing of the images projected thereupon. Also, the viewer/projector of the above-cited patent may be equipped to operate in a portable manner from a 12 volt source such as, for example, through a cigarette lighter on an automobile or a portable battery pack or the like. Under such circumstances, again with probable high ambient light conditions, the illumination available from the 12 volt system may not be sufficient to provide good, bright viewable images under the conditions described.

SUMMARY OF THE INVENTION

In accordance with the present invention, a photographic apparatus for projection of an image recorded on transparent photographic film for viewing of the image is provided. The viewing apparatus comprises a housing defined in part by a first rear projection viewing screen and also includes a second rear projection screen which is substantially smaller than the first screen. Means are provided in the apparatus for supporting the photographic film in a desired projection plane within the housing and a projection means is provided for alternately projecting the image onto the first screen or onto the second screen in a manner such that the image substantially fills the first screen or the second screen in either case. Such an arrangement permits the image to be viewed on the first screen under normal ambient lighting conditions and on the smaller second screen under substantially higher ambient lighting conditions where good viewing on the first screen would not be possible.

In the preferred embodiment, the viewing apparatus is a rear projection viewer of the type wherein the projected images are initially directed from a horizontal projection plane downward towards a reflective element or mirror which in turn redirects the images along an axis substantially forwardly and upwardly to the first primary viewing screen for viewing under normal ambient lighting conditions. Means are then provided for removing the reflective element out of the path of the projected images so that the projected image falls upon the second smaller screen which is disposed in the base of the viewer housing, accordingly, permitting viewing of the images on the small screen when the mirror is moved from the projection path and the viewer is placed with its front face facing downwardly.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will be best understood from the following description of the preferred embodiment when read in connection with the accompanying drawings wherein:

DESCRIPTION OF THE PREFERRED EMBODIMENT

Figure 1:
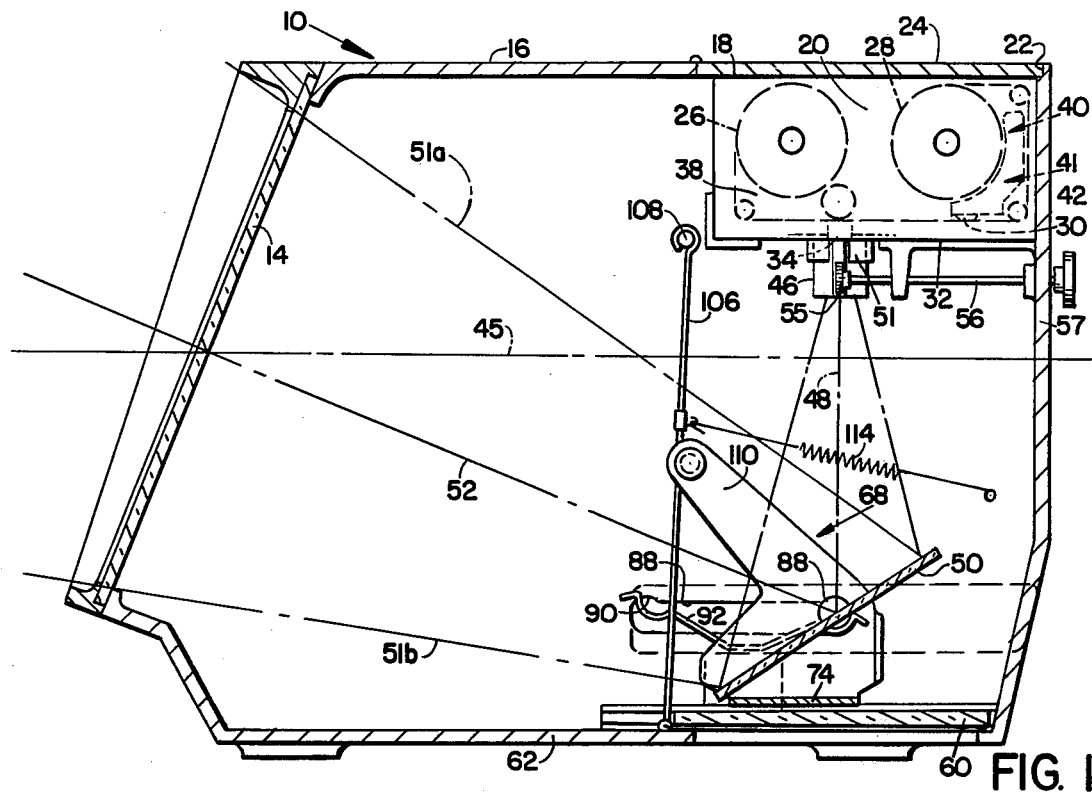
FIG. 1 is a sectional side elevational view of a motion picture viewer embodying the features of this invention in a position for viewing in a conventional fashion.
Figure 2:
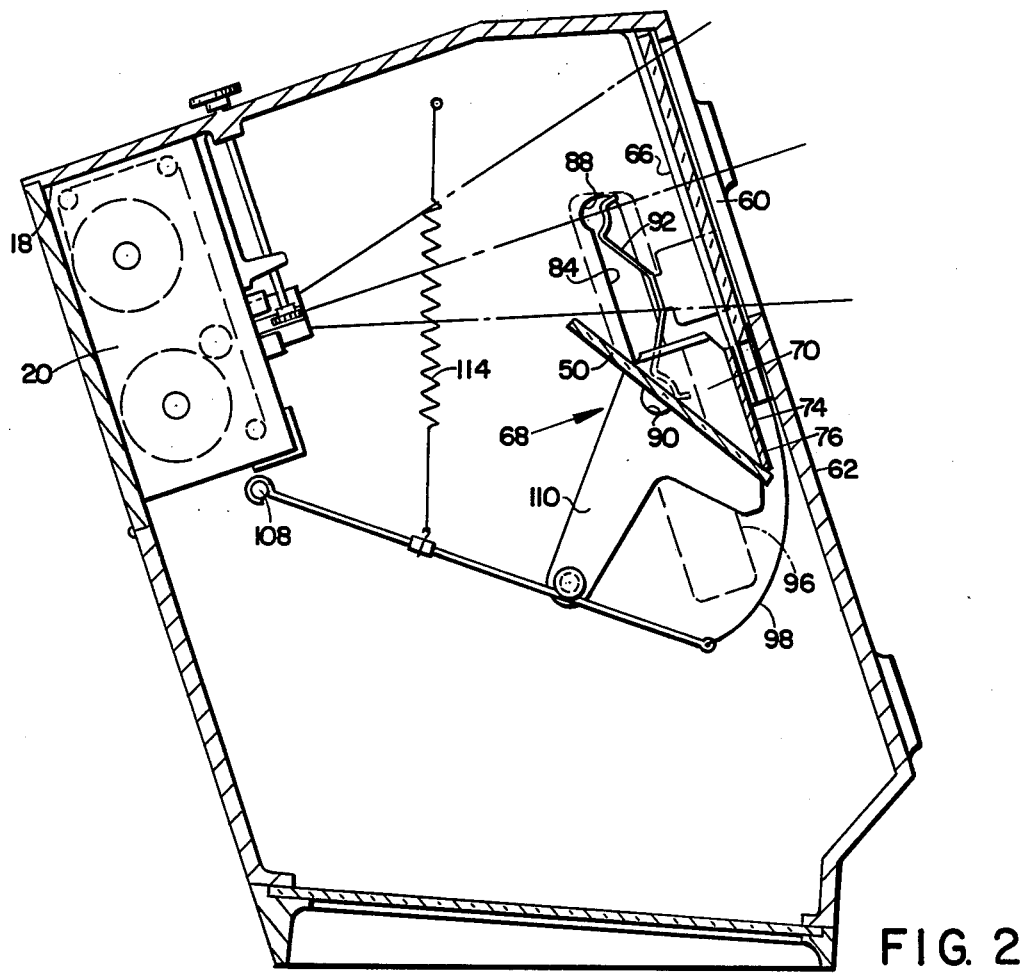
FIG. 2 is a view similar to FIG. 1 showing the apparatus in position for viewing on an auxiliary screen.

As shown in FIGS. 1 and 2, the photographic apparatus of the present invention preferably takes the form of a rear projection viewer 10 comprising a box-like housing 12 defined in part by a front viewing screen 14. Positioned rearwardly of the screen 14, and in adjoining relation to the top surface 16 of the housing 12 is a cassette receiving well 18 which is adapted to receive a motion picture film cassette 20. The cassette receiving well 18 extends to and is in communication with an opening 22 in the top surface 16 of the housing 12. Pivotally mounted at the forward edge of the opening 22 is a door member 24 for controlling access to the cassette well 18. Hence, the door 24 is mounted for pivotal motion between a closed position as shown in the drawings, blocking the opening 22, and an open position permitting insertion and removal of the cassette 20.

The cassette 20 is a multipurpose motion picture film cassette and may, for example, take the form of the cassette described in U.S. Pat. No. 3,608,455 entitled "System for Processing a Strip of Photographic Material", which is assigned to the assignee of the present invention and which cassette is designed for exposure, processing and projection without removal of its film from the cassette casing. Preferably, the cassette comprises a generally flat parallelepiped casing enclosing a pair of motion picture film spools 26 and 28 to which a motion picture film strip 30 is attached so as to be disposed for transport between one spool and the other in an arrangement wherein portions of the film are advanced across a film gate or opening 34 which facilitates projection of the film images in a manner to be subsequently described.

Means are also provided in the cassette 20 to permit entrance of suitable illumination and for redirecting such illumination in a downward direction through the film 30 and out of the opening 34. For example, in this embodiment, an opening or aperture 36 is provided in one side wall 38 which adjoins the lower edge 32 of the cassette 20, and a reflector element (not shown) such as a mirror or prism, is included within the cassette to redirect the light entering aperture 36, out of the projection station opening 34. Hence, an illumination means (not shown) for example a conventional projection lamp is mounted in the apparatus and in adjoining relation to the aperture 36 so as to suitably direct illumination into the cassette 20. It will therefore be appreciated that the cassette opening 34 serves, in part, to define an exposure station during a first transport of the film 30 thereacross and a projection station during subsequent passes of the film strip thereacross.

Carried within the cassette 20 is a processing station 40, such as described in the aforementioned U.S. patent, which includes a processor 41, designed for selective operation for distribution of an appropriate processing fluid (not shown) over the film 30 during transport of the latter past the dispensing surface or processor nozzle 42, located near the bottom of the processor. In the preferred embodiment, the processor 41 is perpendicular to the plane of the projection station opening 34, and is intended for operation in an upright attitude which facilitates gravitational flow of its fluid to the lower dispensing nozzle 42. Consequently, the well 18 is adapted to locate the cassette 20 in the vertical plane with its projection edge 32 parallel to the longitudinal axis 45 of the viewer 10 and hence, in a horizontal plane.

Included within the housing 12 in adjoining relation to the cassette receiving well 18 are means (not shown) for driving spools 26 and 28 for advancing film 30 across the opening 34. For example, appropriate drive shafts (not shown) are adapted to engage the spools 26 and 28 and suitably rotate them, and a conventional claw arrangement (not shown) is adapted to engage film strip 30 in a conventional manner in the vicinity of the cassette opening 34 so as to progressively advance incremental sections of the film thereacross.

Mounted beneath the cassette receiving well 18 in alignment with the opening 34 is a lens assembly 46, adapted to project an image of the film presented at the opening 34 and focus it at a desired plane at a desired distance from the film 30. As illustrated in FIG. 1, the lens assembly 46 directs an image vertically downward along an optical axis designated as 48 to a reflective means such as a mirror 50, mounted in the path of the axis 48 and at an acute angle thereto so as to redirect the projected image forwardly in a diverging path defined by the light rays 51a, 51b, along an upwardly inclined axis 52 onto the rear of the screen 14. The screen 14 is preferably disposed normal to the axis 52 to reduce pictorial distortion and, as set forth in the above-cited U.S. Pat. No. 3,848,980 it is preferably provided with means for redirecting the viewing axis downwardly to partially offset the upward inclination of the axis 52.

Also included within the apparatus housing 12 are means for focusing the projected images on the screen 14. These means include an arrangement wherein the lens assembly 46 is displaceably mounted for movement along the optical path 48. For example, lens assembly 46 is slideably mounted in a sleeve 51 which is conventionally affixed to the bottom 53 of the well 18. A rack 54 is mounted on the lens assembly 46 and is engaged by a pinion gear 55 which is coupled, in turn, to a rod 56. The rod 56 extends through the rear wall 57 of the housing 12 to a focus adjusting knob 58 so as to permit rotation of the knob 58 to alter the focus of the projected images to obtain the desired focus for viewing on the front surface of the viewing screen 14.

Figure 3:
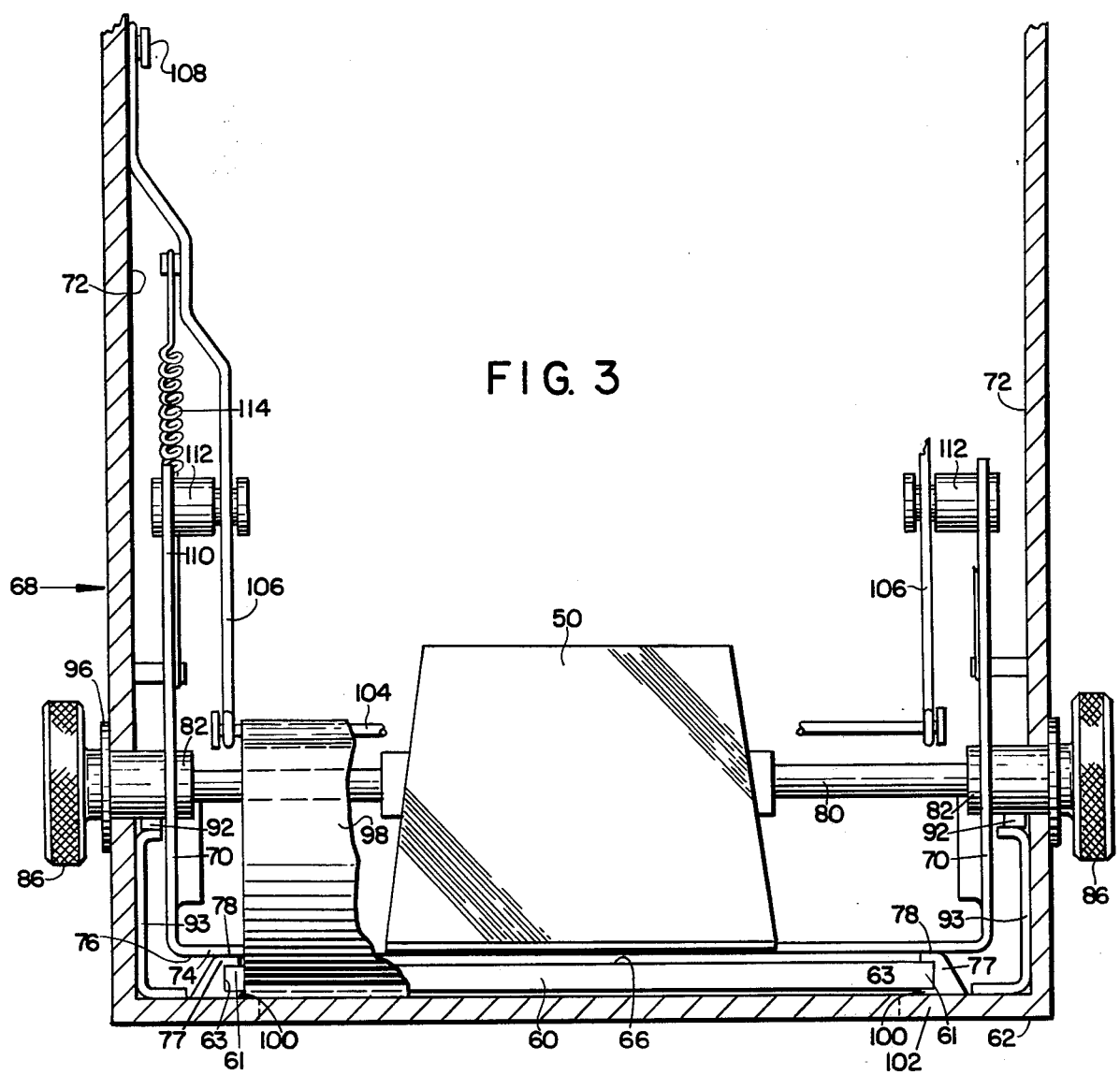
FIG. 3 is an enlarged somewhat simplified fragmentary view of the viewer taken along the line 3—3 of FIG. 2.
Figure 4:
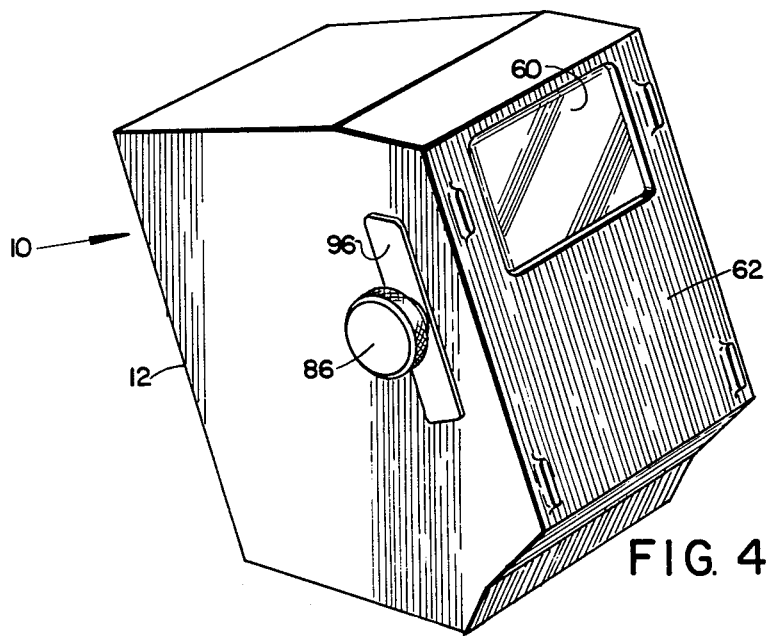
FIG. 4 is a diagrammatic view, in perspective of a motion picture viewer in position for viewing on the auxiliary screen.

Referring now to any of the drawing figures, the rear projection viewer 10 of the present invention is further provided with a second auxiliary viewing screen 60 which is permanently mounted in the base 62 of the viewer housing 12. As best seen in FIG. 3 the lateral edges 61 of the second screen 60 are received in a pair of mounting channels 63 forming a part of the base 62 of the housing 12 and serve to support the screen 60 in the desired position substantially perpendicular to the vertical optical axis 48 of the projected images coming from the lens assembly 46. The size of the second screen 60 is such that if the reflective mirror 50 mounted in the path of the axis 48, to normally redirect the projected images to the main screen 14, is removed from the path of the projected images, the projected images will fall back upon the back face 66 of the second screen 60 thereby permitting viewing of the images upon the second screen when the viewer is positioned with its front viewing face facing downwardly as illustrated in FIGS. 2 and 4. To facilitate description of the means for removing the reflective element 50 out of the path of the images projected along the axis 48, each of the elements of the viewing system involved in such movement will be described as being in its "first position" when the viewer is in a condition to project the images to the large normal viewing screen 14 and likewise will be described as being in its "second position" when the viewing apparatus is in a condition whereby the images may be viewed on the small auxiliary screen 60.

FIG. 1 of the drawings illustrates the apparatus of the present invention in its first position wherein the reflective element of the mirror 50 is in position to direct the projected images to the primary screen 14. The mirror is held in this location at the desired angle by a substantially U-shaped mirror mounting bracket 68 which is slideably disposed within the viewer housing 12. The mirror mounted bracket 68 comprises a pair of upstanding side plates 70 extending adjacent to and parallel to the opposing lateral side walls 72 of the viewer housing 12. The pair of side plates 70 are interconnected at their lower ends by a bottom plate 74 the lower surface of which, 76 is adapted to engage the upwardly facing longitudinal surfaces 78 of the structure 77 defining the auxiliary screen mounting channels 63 described hereinabove. This arrangement serves to stabilize the mirror mounting bracket 68 as will be understood as the description continues.

The mirror element 50 is affixed to a shaft 80 which is, in turn, rotatably mounted in suitable supports 82 carried by the side plate 70 of the mirror mounting bracket 68. The mirror mounting shaft 80 extends at its opposite ends through a pair of elongated slots 84 provided in the side walls 72 of the viewer housing 12 to the exterior of the housing where they are attached to a pair of knobs 86. Rotation of the knobs 86 about the axis of the shaft 80 permits pivotal motion of the mirror 50 about this axis for framing of the projected image reflected by the mirror element 50 to the large front viewing screen 14. The slots 84 provided in the housing side walls 72 through which the ends of the mirror mounting shaft 80 pass extend substantially parallel to the housing base 62 and include a first pair of detents 88 at the end farthest away from the front viewing screen 14 which are positioned to receive the mirror mounting shaft 80 therein thereby accurately positioning the mirror 50 when the mirror mounting bracket 68 is in its first position as shown in FIG. 1. The slots 84 further include a second pair of detents 90 in the end of the slots nearest the front viewing screen which are adapted to receive the mirror mounting shaft 80 when the mirror mounting bracket 68 is in its second position thereby assuring that the mirror is out of the path of the projected images when it is desired to view on the auxiliary viewing screen 60. The viewer is shown in this position in FIG. 2.

Referring to both FIGS. 1 and 2, leaf spring member 92 is provided adjacent the interior of the side walls 72 of the viewer housing 12 in a position to positively bias the mirror mounting shaft 80 into the respective detents 88, 90 when the mirror mounting bracket 68 has been manually moved to one or the other of its positions by manipulations of the pair of exterior knobs 86 and suitable displacement of the mirror mounting bracket 68 by translation of the knobs. The leaf spring members 92 are provided with arcuate mirror mounting shaft engaging surfaces 94 to assist in positive positioning of the mirror mounting shaft 80 in its first or second positions and yet which facilitate relatively easy manual movement of the shaft 80 from the selected position when movement to the other of the positions is desired. The leaf springs 92 are supported in the desired positions by a C-shaped member 93 which in turn is suitably attached to the interior walls and base of the viewer housing 12. Accordingly, as set forth hereinabove, the mirror mounting bracket 68 and the mirror 50 carried thereby is illustrated in its first position, for viewing on the front screen 14, in FIG. 1 and similarly is illustrated fixed in its second position, for viewing on the auxiliary screen 60, in FIG. 2. As illustrated in phantom lines in FIGS. 1 and 2, and as illustrated in FIGS. 3 and 4, a pair of light baffling plates 96 are carried by each of the mirror mounting bracket displacement knobs 86. These plates 96, are configured such that they overlie the spotted openings 84 provided in the side wall 72 of the apparatus housing thereby precluding passage of undesirable light into the interior of the viewer during operation thereof. The light baffling plates are sized such that they entirely overlie the slotted openings 84 regardless of the position of the mirror mounting bracket 68.

The structure described hereinabove is sufficient to enable viewing upon both of the screens of the described viewer. That is, the second or auxiliary screen 60 could serve as a portion of the bottom of the viewer housing 12 without permitting passage of undesirable quantities of light into the housing during normal viewing operations. In the illustrated embodiment, however, a semiflexible opaque protective cover 98 is provided to completely cover the auxiliary screen 60 when the mirror 50 is in its first position and to be withdrawn completely from the screen when the mirror mounting bracket 68 and mirror 50 is displaced to its second position. The opaque cover sheet 98 is, as best seen in FIG. 3, slideably disposed in a pair of tracks 100 defined by the auxiliary screen itself and a slightly overlapping portion 102 of the base portion of the viewer housing adjacent the lateral edges of the second viewing screen 60. The opaque cover 98 is attached at its end nearest the front viewing screen 14 to an elongated rod 104 which extends beyond the lateral edges of the auxiliary screen 60. The ends of the rod 104 are, in turn, rotatably attached to a pair of elongated rod-like members 106 which are pivotally mounted within the viewer housing 12 at a location 108 as viewed in FIG. 1 above the base 62 of the viewer housing. The rod members 106 are configured such that rotation of the rod-like members 106 about their pivotal mountings 108 towards the front viewing screen 14 of the viewer will result in withdrawal of the opaque cover 98 from its first position overlying the auxiliary screen 60 to its second position out of overlying engagement with the screen 60. Each of the side plates 70 of the mirror mounting bracket 68 is provided with an extension 110 directed substantially towards the front viewing screen 14 and is further provided at the end of each of these extensions 110 with a suitable means, such as the cylindrical elements 112 for slideably engaging the pair of structural rod-like members 106. As best seen in FIGS. 1 and 2 a resilient means, such as a spring 114 is attached to each of the rod-like members 106 in a manner to resiliently bias the rod-like member 106 into engagement with the sliding contact element 112 carried by the extensions of the side plates 70. The geometry of the extensions 110 of the side plates and the pivot point 108 of the rod-like members 106 is such that displacement of the mirror mounting bracket 68 from its first position to its second position results in rotation of the rods 106 and complete withdrawal of the opaque cover 98 from overlying engagement with the auxiliary viewing screen 60, i.e, it causes displacement of the opaque cover 98 from its first position to its second position.

Accordingly, it should be appreciated that the above described rear projection viewing apparatus will permit viewing of a projected image upon the primary viewing screen 14 under most normal viewing conditions where the ambient light is not extremely bright, for example, in a normally illuminated room or outside on a not unusually bright day. The apparatus further is capable of permitting satisfactory viewing of the projected image upon the small auxiliary screen under high ambient light conditions which may not permit satisfactory viewing upon the primary screen 14. According to the invention, the user need only grasp the pair of knobs 86 and move them from their first position to their second position and place the viewer with its front screen 14 facing downwardly and properly focus the image on the small screen by use of the focusing knob 58. Conversion of the viewer back to condition for viewing on the front screen 14 is equally as simple, i.e., movement of the knobs 58 back to their first position and reorientation of the viewer for viewing on the screen 14 and proper focus of the lens assembly.

What is claimed is:

1. Photographic apparatus for projection of an image of given size recorded on transparent photographic film for viewing of the image comprising:

a housing defined in part by a first rear projection viewing screen and a second rear projection viewing screen, said second screen being substantially smaller than said first screen;

means for supporting the photographic film in a projection plane within said housing; and means, including a single projection lamp and projection lens assembly for alternately projecting the image onto said first screen or onto said second screen with the image substantially filling said first or second screen in either instance, whereby said image may be viewed on said first screen under normal ambient lighting conditions and on said second screen under substantially higher ambient lighting conditions.

2. The photographic apparatus of claim 1 wherein said housing further comprises a base defining a support surface, said projection plane being spaced from and substantially parallel to said support surface and wherein said means for alternately projecting includes means for projecting the image downwardly in a diverging path along a first axis substantially normal to said support surface and a reflective element located in adjoining relation to said base and configured for redirecting the image along an upwardly inclined axis, said first rear projection screen being disposed substantially normal to said upwardly inclined axis.

3. The photographic apparatus of claim 2 further including means for removing said reflective element from said diverging path of said directed image along said first axis; and wherein said second rear projection viewing screen is disposed substantially parallel to said support surface and substantially normal to said first axis to receive said projected images thereupon when said reflective element has been removed from said diverging path, whereby said projected image may be viewed upon said second rear projection screen in its proper orientation when said apparatus housing is positioned with its first rear projection viewing screen facing downward.

4. Photographic apparatus for projection of images recorded on photographic film for viewing of the images comprising:

a housing defined in part by a first rear projection viewing screen and a second rear projection viewing screen, said second screen being substantially smaller than said first screen;

means for supporting the photographic film in a projection plane within said housing;

image projecting means mounted within said apparatus housing for projecting images of the film lying in said projection plane along a desired projection path; and means for causing said projecting means to selectively project along either a first projection path wherein said projected images are projected upon the rear of said first projection screen permitting viewing of said images from a viewing zone located forwardly of said first screen, said images substantially filling said first screen, or to project along a second projection path wherein said projected images are projected upon the rear of said second rear projection screen permitting viewing of said images from a viewing zone located forwardly of said second screen, said images substantially filling said second screen, said second substantially smaller viewing screen resulting in a brighter image than that of said first projection screen, said brighter image permitting satisfactory viewing under higher ambient light conditions.

5. Photographic apparatus for projection of images recorded on photographic film for viewing of the images comprising:

a housing having a base defining a support surface, a front viewing face and a pair of spaced opposing lateral side walls;

image projecting means mounted within said apparatus housing for projecting images of the film toward said front face, said image projecting means including lens means for projecting images of the film downwardly in a diverging path along a first axis substantially normal to said support surface, a reflective element located in adjoining relation to said base and configured for redirecting said images along an upwardly inclined axis towards said front face, said front face including a rear projection screen disposed substantially normal to said upwardly inclined axis permitting viewing of said images from a viewing zone located forwardly of said apparatus;

means for removing said reflective element from said diverging path of said directed image along said first optical path; and a second viewing screen substantially smaller than said screen of said front face and disposed substantially parallel to said support surface and substantially normal to said first axis to receive said projected images of said film projected from said lens means along said first axis when said reflective element has been removed from said diverging path, whereby said projected images may be viewed in their proper orientation upon said second screen when said apparatus housing is positioned with its front viewing face facing downward.

6. The apparatus of claim 5 wherein said removing means includes means for supporting said reflective element, said supporting means being slideably disposed within said housing in a manner to be displaced from a first position, wherein said reflective element serves to direct said projected images to said rear projection screen, to a second position wherein said projected images are projected to said second viewing screen.

7. The apparatus of claim 6 including means coupled to said supporting means and extending exteriorly of said housing so as to be accessible to the operator of said apparatus for manually displacing said supporting means between said first and second positions.

8. The apparatus of claim 7 wherein said housing further includes a pair of spaced opposing lateral side walls and said supporting means further comprises a pair of structural elements slideably disposed adjacent the interior sides of said spaced opposing lateral side walls, said structural elements having a structural interconnecting member extending therebetween which is disposed in the region between the backside of said reflective element and said second viewing screen and wherein said means for displacing said supporting means comprises a pair of operator engagable knobs disposed exteriorly of said apparatus, each of said knobs having suitable connector means extending through complimentary elongated slots provided in the respective side walls of said apparatus, said slots extending substantially parallel to said support surface and said connector members extending to the interior of said apparatus and each being attached to one of said pair of structural elements, whereby longitudinal movement of said operator engaged knobs within said slots results in displacement of said supporting means and said reflective element carried thereby from one of said first or second positions to the other of said positions.

9. The apparatus of claim 8 including means for selectively retaining said supporting means in one of said first or second positions.

10. The apparatus of claim 9 wherein said means for retaining comprises a first detent and a second detent at opposite ends respectively of at least one of said slots, said first detent being engaged by one of said connector means when said supporting means is in its said first position and said second detent engaged by one of said connector means when said supporting means is in its said second position.

11. The apparatus of claim 10 further including means for biasing said connector means into each of said first and second detents when said supporting means is in its said first and second positions respectively.

12. The apparatus of claim 5 wherein said second viewing screen is rigidly mounted in said housing base and wherein said base further comprises a movable opaque cover configured to overlie the outer viewing surface of said second screen when in a first position and which is displaceable to a second position not in overlying relation with said second screen.

13. The apparatus of claim 12 wherein the lateral edges of said displaceable opaque cover extend beyond the lateral edges of said viewing surface of said second screen and wherein said base further includes a pair of parallel tracks extending on opposite sides of said lateral edges of said viewing surface of said second screen and which are adapted to slideably receive said lateral edges of said opaque cover therein.

14. The apparatus of claim wherein said second viewing screen is rigidly mounted in said housing base and said base comprises a movable opaque cover configured to overlie the entire outer surface of said second screen when in a first position and which is displaceable to a second position not in overlying relation with said second screen, and further including means cooperating with said reflective element mounting means for displacing said opaque cover from one of its said first or second positions to the other of its said positions when said reflective element mounting means is displaced from one of its said first or second positions to the other of its said positions.

15. Photographic apparatus intended for use with a photographic film cassette for projection of images recorded on a film strip carried in the cassette for viewing of the images, the cassette including a casing having an opening therein for facilitating projection operations and means for progressively advancing the film strip across the projection opening responsive to actuation by external drive means, said apparatus comprising:
  a housing having a base defining a support surface, a front viewing face, a pair of spaced opposing lateral side walls and a top surface of generally planar configuration extending rearwardly from the top edge of said front face in generally parallel relation to said support surface;
  means for receiving the cassette in an operative location rearwardly of said front viewing face, said receiving means including a slot-like opening in said top surface and a cassette receiving well in communication with said slot-like opening, said well being configured for receiving the cassette with its projection opening in a lowermost location;
  drive means disposed adjacent said well and configured for cooperation with the advancing means of the cassette for advancing the film strip across the projection opening when the cassette is received in its operative location in said well;
  image projecting means mounted within said apparatus housing for projecting images of the film strip toward said front face, said image projecting means including lens means, disposed below said well in operative relation to the cassette projection opening when the cassette is received in its said operative location, for projecting images of the film downwardly in a diverging path along a first axis substantially normal to said support surface, a reflective element located in adjoining relation to said base and configured for redirecting said images along an upwardly inclined axis toward said front face, said front face including a rear projection screen inclined rearwardly over said base and substantially normal to said upwardly inclined axis permitting viewing of said images from a viewing zone located forwardly of said apparatus;
  means for removing said reflective element from said diverging path of said directed image along said first optical path; and
  a second viewing screen substantially smaller than said viewing screen of said front face and disposed substantially parallel to said support surface and substantially normal to said first axis to receive said projected images of said film projected from said lens means along said first axis when said reflective element has been removed from said diverging path, whereby said projected images may be viewed in their proper orientation, upon said second screen when said apparatus housing it positioned with its said front viewing face facing downward.

16. The apparatus of claim 15 wherein said removing means includes reflective element mounting means adapted to support said reflective element and which is slideably disposed within said housing in a manner to be displaced from a first position, wherein said reflective element serves to direct said projected images to said rear projection screen, to a second position wherein said projected images are projected to said second viewing screen.

17. The apparatus of claim 16 including means coupled to said reflective element mounting means and extending exteriorly of said housing so as to be accessible to the operator of said apparatus for manually displacing said reflective element mounting means between said first and second positions.

18. The apparatus of claim 17 wherein said reflective element mounting means further comprises a pair of structural elements slideably disposed adjacent the interior sides of said spaced opposing lateral side walls of said apparatus, said structural elements having a structural interconnecting member extending therebetween which is disposed in the region between the backside of said reflective element and said second viewing screen, and wherein said means for displacing said reflective element mounting means comprises a pair of operator engagable knobs disposed exteriorly of said apparatus, one adjacent each of said side walls, each of said knobs having suitable connector means extending through complementary elongated slots provided in its said respective side wall of said apparatus, said slots extending substantially parallel to said support surface and said connector members extending to the interior of said apparatus and each being attached to one of said pair of structural elements slideably disposed adjacent said apparatus side walls whereby movement of said operator engaged knobs within said slots results in displacement of said reflective element mounting means and said reflective element carried thereby from one of said first or second positions to the other of said positions.

19. The apparatus of claim 18 including means for selectively retaining said reflective element mounting means in one of said first or second positions.

20. The apparatus of claim 19 wherein said means for retaining comprises a first detent and a second detent at opposite ends respectively of at least one of said slots, said first detent being engaged by one of said connector means when said reflective element mounting means is in its said first position and said second detent being engaged by one of said connector means when said reflective element mounting means is in its said second position.

21. The apparatus of claim 20 further including means for biasing said connector means into each of said first and second detents when said reflective element mounting means is in its said first and second positions respectively.

22. The apparatus of claim 15 wherein said second viewing screen is rigidly mounted in said housing base and wherein said base further comprises a movable opaque cover configured to overlie the outer viewing surface of said second screen when in a first position and which is displaceable to a second position not in overlying relation with said second screen.

23. The apparatus of claim 22 wherein the lateral edges of said displaceable opaque cover extend beyond the lateral edges of said viewing surface of said second screen and wherein said base further includes a pair of parallel tracks extending on opposite sides of said lateral edges of said viewing surface of said second screen and which are adapted to slideably receive said lateral edges of said opaque cover therein.

24. The apparatus of claim 16 wherein said second viewing screen is rigidly mounted in said housing base and said base comprises a movable opaque cover configured to overlie the entire outer surface of said second screen when in a first position and which is displaceable to a second position not in overlying relation with said second screen, and further including means cooperating with said reflective element mounting means for displacing said opaque cover from one of its said first or second positions to the other of its said positions when said reflective element mounting means is displaced from one of its said first or second positions to the other of its said positions.

25. The apparatus of claim 24 wherein said opaque cover is made from a semi-flexible material and the lateral edges of said opaque cover extend beyond the lateral edges of the front viewing face of said second screen, said base further including a pair of parallel trackes extending on opposite sides of said lateral edges of said viewing face of said second screen which are adapted to slideably receive said lateral edges of said opaque cover therein, and wherein said means for displacing said opaque cover includes at least one elongated structural rod attached at one end thereof to the edge of said flexible opaque cover in nearest proximity to said front face of said apparatus, the other end of said elongated rod being pivotally supported for rotating around a fixed pivot point within said apparatus housing such that pivotal movement of said rod from a first position wherein said opaque cover is in its said first position, in a direction towards said front face of said housing, to a second position will result in displacement of said opaque cover from its said first position to its said second position; and further wherein said reflective element mounting means comprises an extension of at least one of said pair of slideably disposed structural elements in a direction towards said front face of said apparatus, said extension having means for slideably engaging said elongated rod in a manner to displace said elongated rod from its said first position to its said second position when said reflective element mounting means is displaced from its said first position to its said second position; and means for resiliently biasing said elongated structural rod towards its said first position.

* * * * *